United States Patent
Himmighoefer et al.

(10) Patent No.: US 10,109,019 B2
(45) Date of Patent: Oct. 23, 2018

(54) ACCELERATED DISAGGREGATION IN ACCOUNTING CALCULATION VIA PINPOINT QUERIES

(71) Applicants: Peter Himmighoefer, Roemerberg (DE); Lubos Cus, Brno (CZ)

(72) Inventors: Peter Himmighoefer, Roemerberg (DE); Lubos Cus, Brno (CZ)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 14/528,587

(22) Filed: Oct. 30, 2014

(65) Prior Publication Data

US 2016/0092992 A1    Mar. 31, 2016

Related U.S. Application Data

(60) Provisional application No. 62/058,000, filed on Sep. 30, 2014.

(51) Int. Cl.
| | |
|---|---|
| *G06F 7/00* | (2006.01) |
| *G06Q 40/00* | (2012.01) |
| *G06F 17/30* | (2006.01) |

(52) U.S. Cl.
CPC ....... *G06Q 40/12* (2013.12); *G06F 17/30445* (2013.01); *G06F 17/30646* (2013.01)

(58) Field of Classification Search
CPC .............. G06F 40/12; G06F 17/30646; G06F 17/30445
See application file for complete search history.

(56) References Cited

U.S. PATENT DOCUMENTS

| | | | | |
|---|---|---|---|---|
| 6,356,880 | B1* | 3/2002 | Goossens | G06Q 10/06 705/30 |
| 7,093,250 | B1* | 8/2006 | Rector | G06F 9/4881 718/100 |
| 7,219,073 | B1* | 5/2007 | Taylor | G06F 17/30684 705/1.1 |
| 2003/0139960 | A1* | 7/2003 | Nishikawa | G06Q 40/02 705/30 |
| 2003/0216977 | A1* | 11/2003 | Hayashi | G06Q 40/02 705/30 |
| 2006/0136495 | A1* | 6/2006 | Schaad | G06Q 10/06 |
| 2006/0218125 | A1* | 9/2006 | Kandil | G06F 11/362 |
| 2007/0016465 | A1* | 1/2007 | Schaad | G06Q 10/06 705/7.15 |
| 2007/0124162 | A1* | 5/2007 | Mekyska | G06Q 10/06 705/30 |

(Continued)

OTHER PUBLICATIONS

Goktas, "KE-28 Top-down distribution in CO-PA," SAP Community Network, Mar. 30, 2010, 2 pages.

(Continued)

*Primary Examiner* — Ramsey Refai
(74) *Attorney, Agent, or Firm* — Klarquist Sparkman, LLP

(57) ABSTRACT

As part of an accounting function calculation, work is distributed among a plurality of tasks for execution in parallel. Pinpoint queries run within the tasks return pinpoint accounting cost senders associated with a given accounting cost receiver. The database can be organized to handle repeated multiple pinpoint queries. Superior performance can result compared to an approach that attempts to match senders with receivers in a common task.

20 Claims, 11 Drawing Sheets

(56) References Cited

U.S. PATENT DOCUMENTS

| | | | | |
|---|---|---|---|---|
| 2007/0192218 A1* | 8/2007 | Licardi | ............. | G06Q 30/0603 |
| | | | | 705/30 |
| 2007/0226090 A1* | 9/2007 | Stratton | ................ | G06Q 10/00 |
| | | | | 705/30 |
| 2011/0131241 A1* | 6/2011 | Petrou | .............. | G06F 17/30861 |
| | | | | 707/770 |
| 2012/0203588 A1* | 8/2012 | Burri | ............... | G06Q 10/06311 |
| | | | | 705/7.14 |

OTHER PUBLICATIONS

Cheah, "Top Down Distribution KE28 in COPA," SAP Community Network, Oct. 8, 2010, 3 pages.
"KE28—Create top-down distribution," SAP Transactions, visited Oct. 23, 2014, 2 pages.
"KE28 (Configure and) Execute Top-Down Distribution of Actual Data," SAP Community Network, Jan. 31, 2014, 6 pages.
"Top-Down Distribution of Actual Data," SAP Community Network, Feb. 5, 2014, 4 pages.
"KE28—Variant Start of CO-PA Top-Down Distribution," SAP Community Network, Jan. 31, 2014, 5 pages.
"KE28T—Technical Settings for CO-PA Top-Down Distribution," Jan. 31, 2014, 3 pages.
Email exchange between inventor Peter Himmighoefer and SAP customer L'Oréal USA, describing process of providing SAP access to L'Oréal system to implement notes (code changes) for performance testing of optimized KE28 implementation (note 1800989) on L'Oréal system, dated Aug. 23, 2013, 2 pages.
Email to inventor Peter Himmighoefer, describing trace in production system implementation of optimized KE28 on SAP customer L'Oréal USA system, dated Oct. 2, 2013, 1 page and 1 page translation.

* cited by examiner

ACCELERATED DISAGGREGATION IN ACCOUNTING CALCULATION VIA PINPOINT QUERIES

CROSS REFERENCE TO RELATED APPLICATION

This application claims the benefit of U.S. Provisional Patent Application No. 62/058,000, filed Sep. 30, 2014, which is hereby incorporated herein by reference.

BACKGROUND

Database systems are typically able to perform accounting calculations in an efficient and timely manner. However, the desire to have customized, accurate accounting data for some accounting calculations can lead to very complex scenarios that challenge even the most robust database system.

There is therefore room for improvement.

SUMMARY

The Summary is not intended to identify key features or essential features of the claimed subject matter, nor is it intended to be used to limit the scope of the claimed subject matter.

An embodiment can be implemented as a method implemented at least in part by a computer, the method comprising allocating a plurality of accounting cost senders to a plurality of different tasks; and within the tasks, locally working through the accounting cost senders via a method comprising (a)-(b): (a) for a given accounting cost sender, locally identifying one or more pinpoint accounting cost receivers; and (b) locally distributing accounting costs for the given accounting cost sender among the pinpoint accounting cost receivers.

An embodiment can be implemented as system comprising a disaggregation calculation orchestrator configured to receive a plurality of accounting cost senders and distribute the accounting cost senders among a plurality of separate tasks; and within the plurality of separate tasks, respective local disaggregation calculation engines configured to, for a given accounting cost sender, identify pinpoint accounting cost receivers for the given accounting cost sender according to one or more tracing factors for the given accounting cost sender and distribute costs for the given accounting cost sender among the pinpoint accounting cost receivers.

An embodiment can be implemented as one or more computer-readable media comprising computer-executable instructions that when executed by a computing system perform a method comprising receiving a plurality of accounting cost senders representing market segments of products; distributing the accounting cost senders among a plurality of tasks; within the tasks, independently executing a method locally, wherein the method comprises, for a given accounting cost sender out of the distributed accounting cost senders: (a) constructing a pinpoint query based on characteristics for the given accounting cost sender as specified in a rule that matches accounting cost senders to accounting cost receivers; (b) running the pinpoint query against an orchestration database; (c) responsive to running the pinpoint query, receiving only sales data for pinpoint disaggregation accounting cost receivers associated with the given accounting cost sender via the rule; and (d) distributing costs for the given accounting cost sender among the pinpoint disaggregation accounting cost receivers according to the sales data for the accounting cost receivers.

As described herein, a variety of other features and advantages can be incorporated into the technologies as desired.

DETAILED DESCRIPTION

Example 1

Example Overview

The technologies described herein can be used for scenarios involving accelerated disaggregation in an accounting calculation. As described herein, accelerated disaggregation as performed herein can result in superior performance.

Loading cost accounting senders and cost accounting receivers into memory and then matching them up by searching can require a large memory footprint, and performance can be poor. Even if the database operations are optimized, the procedural task of matching senders to receivers can consume excessive processing time and excessive memory consumption. At the time of reading the data from the database, it is not clear which data will be needed for the disaggregation. Therefore, more data than is necessary may be read. Furthermore, technical database restrictions typically involve accessing data using a subset of the selection criteria.

Instead of loading cost accounting senders and cost accounting receivers into memory and then trying to match them up, a pinpoint query can be used per sender as described herein.

In situations involving costs that are disaggregated, the technologies can perform separate calculations per rule, determining the exact accounting cost receivers for a given accounting cost sender according to the rule. As described herein, a pinpoint query can be used to extract only the pinpoint receivers desired. As a result, performance can be greatly enhanced. Legacy rules can be used with the technologies without having to modify such rules.

The technologies can be helpful to improve calculation performance where disaggregation is involved. Therefore, the technologies can be included in the accounting functionality of database management systems, standalone accounting systems, and the like. End users can benefit from the technologies because they can save time and computing resources, as well as reduce database load.

Example 2

Figure 1:
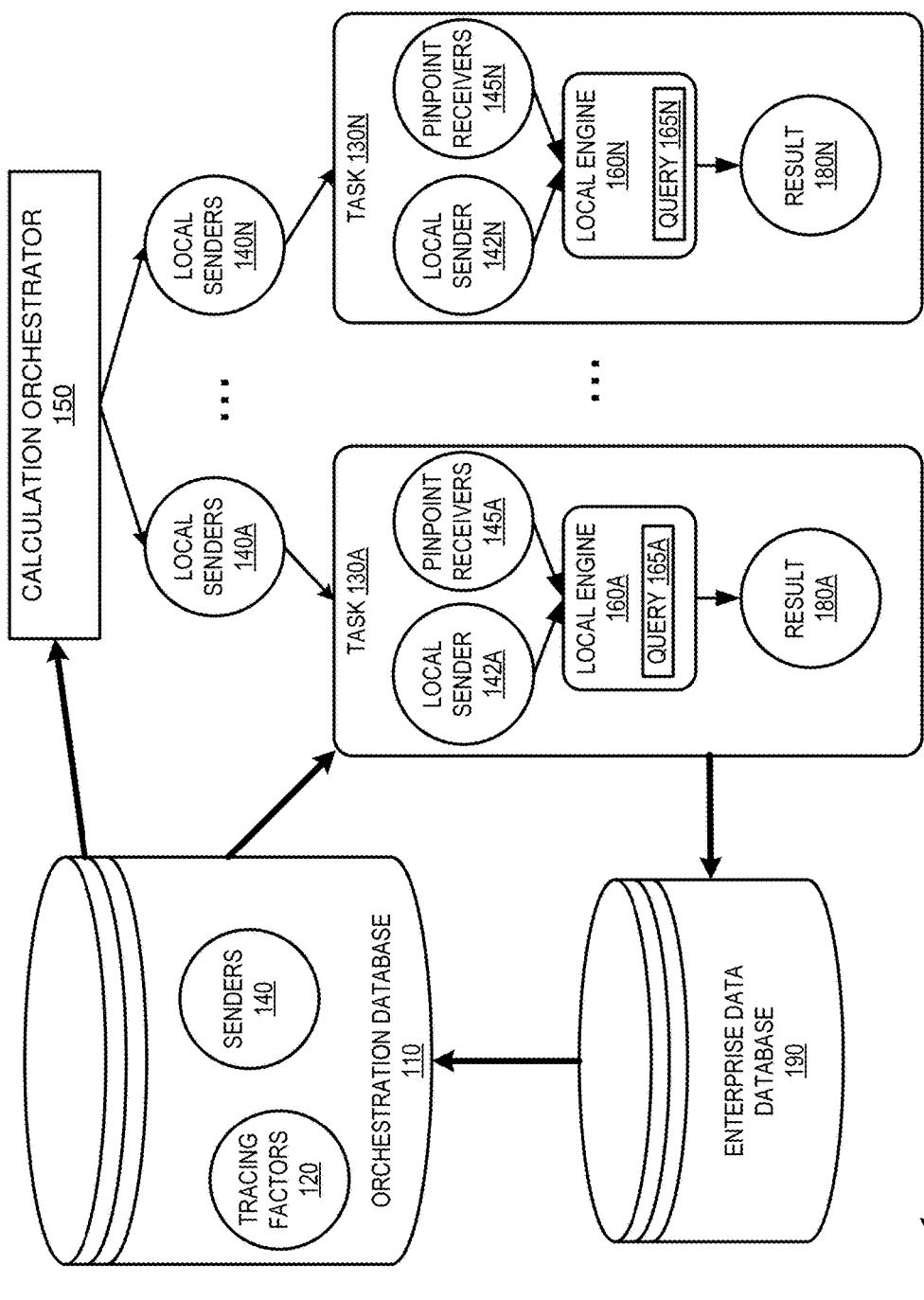
FIG. 1 is a block diagram of an example system implementing accelerated disaggregation in an accounting calculation.

Example System Implementing Accelerated Disaggregation in an Accounting Calculation FIG. 1 is a block diagram of an example system 100 implementing accelerated disaggregation in an accounting calculation as described herein. In the example, a disaggregation calculation orchestrator 150 is configured to receive a plurality of accounting cost senders 140 and distribute them among a plurality of separate tasks 130A-N.

Within the separate tasks 130A-N, respective disaggregation calculation engines can be configured to identify the pinpoint accounting cost receivers 145A-N for a given accounting cost sender 142A-N according to one or more tracing factors 120 as described herein with use of pinpoint queries 165A-N. Such tracing factors can be associated with the senders (e.g., via a rule as described herein). The local engines 160A-N can be further configured to distribute costs for the given accounting cost sender among the pinpoint accounting cost receivers (e.g., as indicated by the rule). A resulting distribution 180A-N can be stored for assembly into a report or the like.

As described herein, the disaggregation calculations at the tasks 130A-N can be performed independently of each other and in parallel.

In the example, the source data resides in an enterprise data database 190. Such a database can store the enterprise resource planning and accounting data on which the calculations can be based. For example, overhead costs, product sales, and the like can be stored in the database 190.

For purposes of the calculation, an orchestration database 110 (e.g., a side-by-side database storing data from the source database 190 that replicates the relevant database tables) can be used. As shown, the orchestration database 110 can include the accounting cost senders 140 for which disaggregation is to be performed as well as the tracing factors 120 for determining corresponding accounting cost receivers and other information as described herein.

In practice, the systems shown herein, such as system 100, can vary in complexity, with additional functionality, more complex components, and the like. For example, additional components can be included to implement security, redundancy, load balancing, report design, single sign on, and the like. In practice, a calculation orchestrator 150 can be distributed among different nodes separate from and/or including the nodes executing the shown tasks 130A-N.

The system 100 and any of the other systems described herein can be implemented in conjunction with any of the hardware components described herein, such as the computing systems described below (e.g., processing units, memory, and the like). In any of the examples herein, the inputs, outputs, rows, tracing factors, sends, receivers, results, engines, and orchestrators can be stored in one or more computer-readable storage media or computer-readable storage devices. The technologies described herein can be generic to the specifics of operating systems or hardware and can be applied in any variety of environments to take advantage of the described features.

Example 3

Example Method Implementing Parallelized Execution of Window Operator

Figure 2:
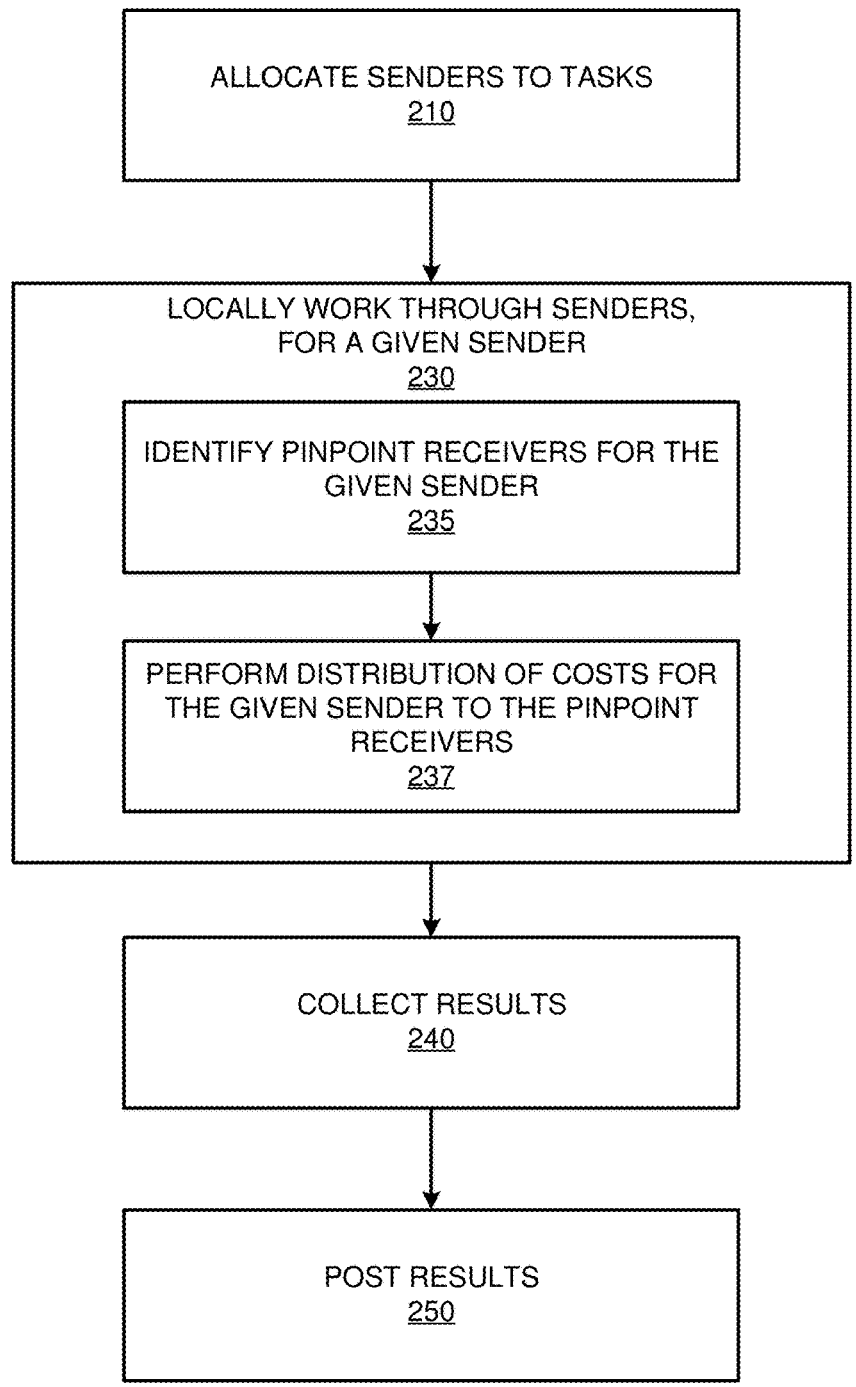
FIG. 2 is a flowchart of an example method of implementing accelerated disaggregation in an accounting calculation.

FIG. 2 is a flowchart of an example method 200 of implementing accelerated disaggregation in a profitability calculation and can be implemented, for example, in the system shown in FIG. 1.

At 210, a plurality of accounting cost senders are allocated to a plurality of different tasks. For example, packages of senders can be sent to the respective tasks for parallel, independent execution as described herein.

At 230, within the different tasks, the accounting cost senders are worked through via the acts 235 and 237. For example, for a given sender at a task, the acts can be performed. The tasks can iterate through their respective allocated senders until they are completed. As described herein, the tasks can be executed in parallel.

At 235, for the given accounting cost sender, one or more pinpoint accounting cost receivers are identified locally. As described herein, such identification can be achieved by constructing a pinpoint query and applying it against a database (e.g., the orchestration database). The query can be constructed from one or more tracing factors associated with the given accounting cost sender, so locally identifying the receivers can be based on such factors. In any of the examples herein, the pinpoint query can return a list (e.g., table) of only the pinpoint accounting cost receivers among which the costs for the sender are to be disaggregated. For example, no receiver that is to be allocated disaggregated costs is missing from the list, and no extra receivers (e.g., receivers that are not included in the disaggregation calculation) are included in the list.

Then, at 237, the accounting costs (e.g., aggregated costs) for the given accounting cost sender are locally distributed (e.g., disaggregated) among the identified pinpoint accounting cost receivers. Such a distribution can be based on one or more tracing factors as described herein. The distribution can be based on revenue generated, sold quantities, or the like as indicated in the data for the pinpoint accounting cost receivers.

At 240, the results can be collected.

At 250, the results can be posted to the database. Subsequently, reports can be constructed to present findings. For example, a profitability analysis can be performed as described herein and the results incorporated into a report.

The method can achieve a top-down distribution of overhead costs among a plurality of revenue-generating products as described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Example Accounting Analysis

In any of the examples herein, an accounting cost sender (or simply "sender") can take the form of a representation of a source of cost that is to be disaggregated (e.g., allocated, split, or the like) among a plurality of accounting cost senders. In practice, such a sender typically represents overhead costs (e.g., aggregated costs) that are not directly traceable to a particular product that is being sold. However, it is still desirable from an accounting standpoint to allocate (e.g., disaggregate) such costs among revenue-generating sales of products. Therefore, as described herein, such costs can be allocated among products as described herein.

Similarly, an accounting cost receiver (or simply "receiver") can take the form of a representation of a destination of cost that has been disaggregated. Thus, they can also be called "disaggregation accounting cost receivers." For example, various groups of products can be assigned the aggregated costs after disaggregated as described herein. Such costs can be distributed among the products (e.g., if many products were sold, the costs are divided among the product number or revenue) or product groups (e.g., certain characteristics of products may be decided as increasing revenue or the like). Receivers are also sometimes called "references."

In practice, although the term "product" is used, overhead or indirect costs are typically not assigned directly to the product, but if possible and feasible, they are allocated to the product revenue or sold quantities of a product (e.g., which is identified by a product identifier in the database) as a tracing factor. The tracing factor is then used to disaggregate such costs as described herein.

In some cases, overhead costs can be quite extensive, making up over 50% or more of total product costs. Therefore, the technologies herein can be used to advantage to reflect an accurate picture of total product costs.

The goal of such an accounting analysis can be to perform a profitability analysis. Therefore, it can be determined which of the products are profitable (e.g., and to what degree) and which are not. For example, costs can be subtracted from revenues generated. In some cases, costs may be directly attributable to a product, but in other cases costs can be disaggregated as described herein.

A given accounting cost sender can correspond to overhead costs for product manufacturing for a group of different product types. The accounting cost receivers can correspond to the different product types, and locally distributing accounting costs for the sender comprises distributing the overhead costs for product manufacturing among the different product types (e.g., proportionally) according to sales figures for the different product types.

Receivers can represent similar products having one or more different characteristics, and costs can be distributed among the receivers (e.g., proportionally) according to revenue generated by or sold quantities of products having the different characteristics.

Example 5

Example Calculation Orchestrator

In any of the examples herein, a disaggregation calculation orchestrator can receive the senders and other information, and orchestrate execution of the disaggregation calculations among a plurality of tasks as shown herein. In practice, the orchestrator can take the form of complied code, interpreted code, just-in-time compilation, or the like. A database management system can include the orchestrator, which can be incorporated into logic and systems for handling other database transactions.

Example 6

Example Disaggregation

In any of the examples herein, disaggregation can take the form of dividing, distributing, allocating, or otherwise assigning costs from an accounting cost sender to one or more accounting cost receivers.

As described herein, such disaggregation can be based on sales of the accounting cost receivers. For example, sales can be in the form of sold units (e.g., how many of the product were sold), sold revenue (e.g., how much revenue was received for the sold product), or the like.

Example 7

Example Independence of Calculations

In any of the examples herein, the disaggregation calculations can be calculated separately within different tasks (e.g., without communication between the tasks). For example, the results of one disaggregation calculation need not affect the results of another, and one does not depend on the other.

So, the plurality of different tasks can perform their work (e.g., identifying the pinpoint cost receivers and distributing the accounting costs among them) independently from each other.

Thus, parallel execution can be performed. So, if more computing resources are available, they can be allocated to the calculations, resulting in better performance.

Example 8

Example Distribution of Senders

In any of the examples herein, when a plurality of senders are allocated to a plurality of different tasks, any number of allocation techniques can be used. As described herein, the senders can be divided into packages that are then provided to the tasks. So, allocating can include dividing senders among the tasks as different packages of pluralities of accounting cost senders.

For example, if there is sufficient hardware to execute n tasks, the senders can be evenly divided into n packages. Such allocation can be controlled based on user settings (e.g., based on the amount of resources that are desired to be allocated to the analysis).

Example 9

Example Nodes

In any of the examples herein, the described tasks can be run at different nodes in parallel. A node can take the form of a thread, process, core, machine, machine group, or other entity that executes in parallel with other entities. Such entities can be real or virtual (e.g., hyper-threading can emulate additional cores), but are ultimately executed on real hardware.

Example 10

Example Data Update

In any of the examples herein, a production (e.g., ERP) database can be replicated to an orchestration database on which the disaggregation calculations are performed. The orchestration database can be periodically updated to better reflect real time data. For example, configuration settings can indicate how often (e.g., 5 minutes, 30 minutes, daily, etc.) records in the orchestration database are to be updated from the source database. Such updating can take place while the analysis is running.

Example 11

Example Database

In any of the examples herein, a database can be implemented to be transaction-safe and support enterprise class database features such as point-in-time recovery, backup and restore, and the like. A database can store data organized as a plurality of records in one or more tables.

In practice, a database can be implemented as part of a larger database management system as described herein.

Although the technologies can be applied in any of a number of database environments, an in-memory, columnar database such as the HANA database of SAP can be used to implement the described technologies.

Example 12

Figure 3:
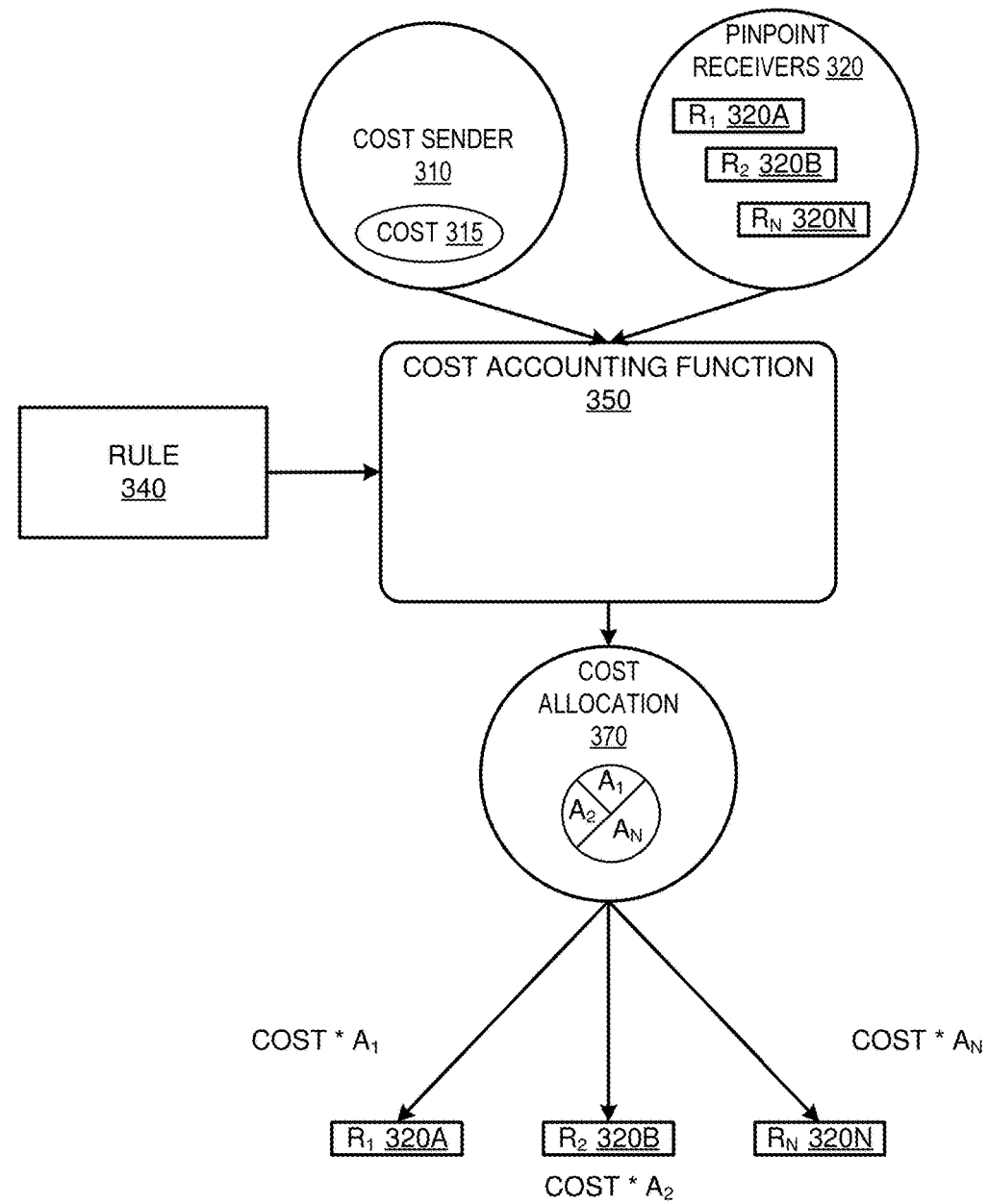
FIG. 3 is a block diagram of an example system implementing distribution of costs among pinpoint accounting cost receivers.

Example System Implementing Distribution of Costs among Pinpoint Accounting Cost Receivers FIG. 3 is a block diagram of an example system 300 implementing distribution of costs among pinpoint accounting cost receivers, as described herein. Such a system 300 can be used to implement disaggregation in a system such as that shown in FIG. 1. Any of the features of system 300 can be incorporated into the system 100 of FIG. 1.

In the example, an accounting cost function 350 is operable to receive an accounting cost sender 310 with an associated cost 315 and one or more pinpoint receivers 320A-N (e.g., associated with a given receiver and indicating how to distribute costs associated with the receiver among the receivers 320A-N). The function 350 serves as a disaggregator that takes the cost 315, which represents a combined cost (e.g., overhead) for producing the receivers 320A-N (e.g., products) and allocates, distributes, or divides (e.g., disaggregates) the cost 315 among the receivers 320A-N.

As described herein, the pinpoint receivers 320A-N can be generated via a pinpoint query as described herein.

The accounting cost function 350 can determine a cost allocation 370 for the receivers 320A-N based on the associated rule 340. For example, any number of scenarios or allocations are possible and can be specified as settings according to the organization for which the calculation is being performed. In the example, a proportional allocation is indicated. For example, a certain percentage is to be allocated to the first group of products (e.g., receiver 320A), a certain percentage is to be allocated to the second group of products (e.g., receiver 320B) and so forth.

Such a proportional allocation can be based on any number of factors such as the number of units sold, sales revenue for the products, and the like. For example, if the first group of products represented by the receiver 320A sold 25% of the total products in the receivers 320A-N, then 25% of the costs can be allocated to the first product group. Such details can be stated in a rule of proportion that is used when disaggregating costs.

In any of the examples herein, the variety and customization of the allocations can be flexible and can be varied to account for any of a number of product characteristics or any other available market segment characteristic represented in the database (e.g., size, color, weight, product family, customer group, country, or the like).

In a proportional scenario, the cost 315 can be multiplied by an allocation factor (e.g., A1, A2, AN), resulting in costs being allocated to the pinpoint accounting cost receivers as shown.

In practice there can be many different senders, and thus many different rules 340. For example, a different rule per sender can be supported. Rule re-use can also be supported if desired during configuration of the calculation.

Example 13

Figure 4:
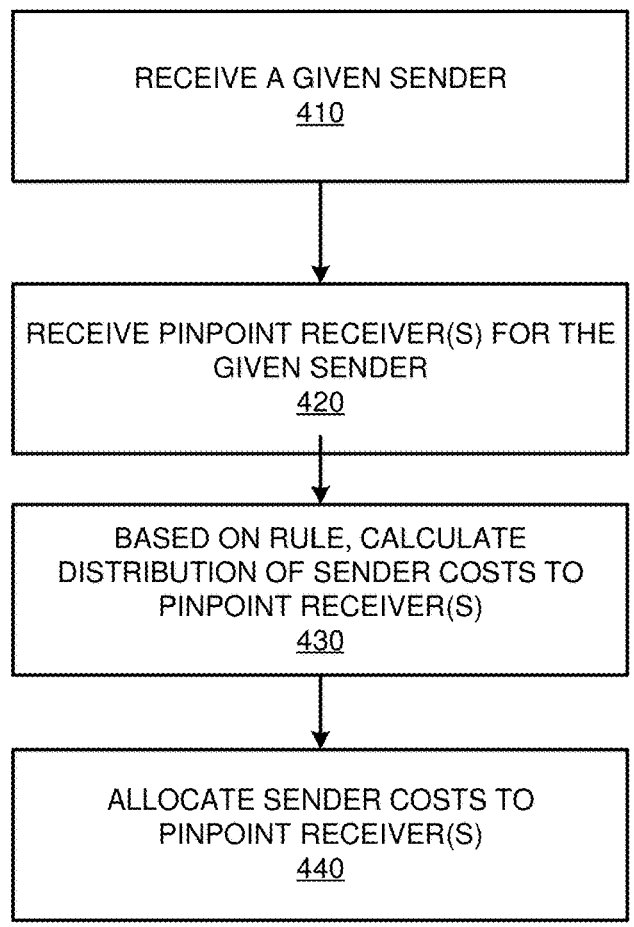
FIG. 4 is a flowchart of an example method implementing distribution of costs among pinpoint accounting cost receivers.

Example Method Implementing Distribution of Costs among Pinpoint Accounting cost Receivers FIG. 4 is a flowchart of an example method 400 implementing distribution of costs among pinpoint accounting cost receivers and can be implemented, for example, in the systems shown in FIGS. 1 and 3.

The method 400 can be incorporated into that of FIG. 2. For example, act 237 can be implemented as the shown acts 410-440.

At 410, information for a given sender is received. A rule associated with the given sender can also be received, identified, or both.

At 420, the pinpoint receivers for the given sender are received. In practice, there can be one receiver, but multiple receivers are shown in some of the examples for illustration purposes. The pinpoint receives can be selected in such a way that the complexity of calculation of the distribution (e.g., 430) is reducible to a simple rule of proportion.

At 430, based on a rule associated with the given sender, a distribution of the sender costs to the pinpoint receivers is calculated. A rule of proportion can be used as described herein.

At 440, the sender costs are allocated to the pinpoint receivers according to the calculated distribution.

Such results can then be combined and posted to the database as described herein.

Example 14

Example Rule for Disaggregation

Figure 5:
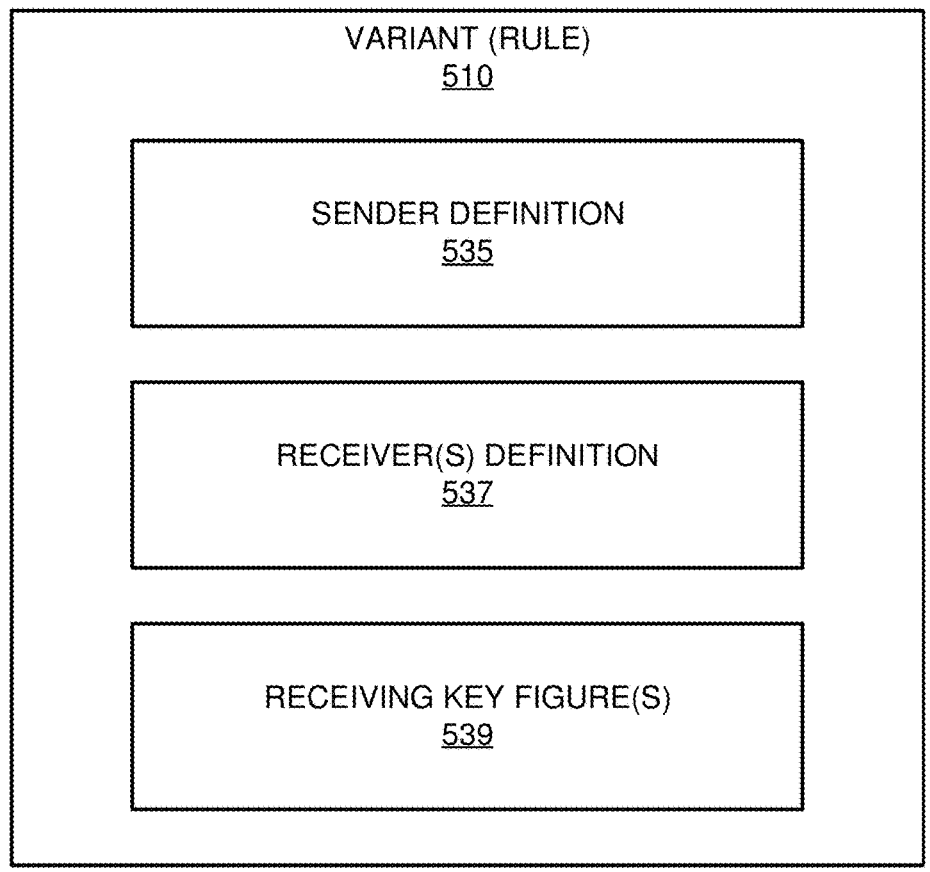
FIG. 5 is a block diagram of a rule for disaggregation of costs as described herein.

FIG. 5 is a block diagram of an example rule 510 for disaggregation of costs as described herein. Such rules can be associated with receivers and applied on a per-receiver basis. The rule 510 matches accounting cost senders to accounting cost receivers.

The rule 510 can serve as a template against which particular values are applied. In some cases, hard values (e.g., percentages) can be indicated, factors can be indicated (e.g., to be applied to a percentage of sales, percentage of revenue, or the like), scaling of values (e.g., a shift of read values by the lowest negative value) can be indicated, or calculated key figures such as net revenue can be indicated. In such a case, the resulting query can be constructed from the rule.

In the example, the rule includes a sender definition 535. Such a definition can indicate the sender with which the rule 510 is associated. In practice, this can be total overhead costs posted to market-segments on a granularity above the product (e.g., advertisement costs for a complete brand). In practice, the sender definition 535 can specify a plurality of senders (e.g., different market segments), and the characteristics that distinguish the senders (e.g., market segment) can be used to match up with receivers (e.g., in a particular market segment X). Thus, senders can be matched up to receivers when they have the same values for the specified characteristics.

The receivers definition 537 can indicate one or more receivers associated with the sender of the rule 510. For example, characteristics (e.g., properties) of products or the like can be indicated. The returned senders can have different values for the specified characteristics. The tracing factors by which receivers are allocated costs are thus derivable from the receivers definition 537 (e.g., product with value A for a characteristic had 20% of sales in market segment X, and product with value B for a characteristic had 80% or sales in market segment X).

In the example of advertisement costs, this can be total products sold under a brand of the particular sender. The receiver definition also allows using a mapping rule (n:m) between sender and receiver characteristics. Thus, very complex relations between the sender and tracing factors can be defined.

The receiving key FIG. 539 can indicate how to divide the costs for the sender among the indicated receivers. For example, a simple division among the receivers according to the characteristics can be used (e.g., allocation to products having different properties for the characteristics). However, the rule can support an arbitrary specification or calculation according to configuration wishes.

An example rule is to distribute advertisement costs of a brand down to products belonging to the brand according to net revenues made by a particular product in the current period. In such an example, the senders 535 can be defined as those having values in an Advertisement Costs field (e.g., where the characteristic Product is initial). Senders can be distinguished by the Brand and Sales Organization characteristics.

The distinguishing characteristics can be specified as part of the receivers definition 537 and are therefore copied to a pinpoint query for finding related receivers. For example, if a sender is for Brand X and Sales Organization Y, receivers having Brand X and Sales Organization Y are found via a pinpoint query finding such receivers.

The receiving key FIG. 537 can be defined as Revenue—Sales Deduction, which can be calculated as a tracing factor (e.g., used for proportional allocation of overhead costs associated with the sender).

The sender query reads columns for Advertisement costs, Brand, and Sales Organization, where "Product" is initial. Processing then iterates over the senders as described herein. For the senders, the receiver pinpoint query reads the columns for Revenue—Sales Deduction, WHERE Brand is equal to the sender Brand and the Sales Organization is equal to the sender Sales Organization.

The table returned by the query returns data only for the given sender. One rule can result in a number of queries (e.g., for different senders). For example, if there are a number of brands and sales organizations, there can be many queries.

The rule 510 is sometimes call a "variant" because a plurality of rule variations can be run against the database. As described herein, the pinpoint query and parallelization technologies can support execution of a large number of rules.

In practice, an organization can have 1000+ rules (e.g., one per variant), which contains some hundred senders and some thousand receivers per sender.

In addition, such rules can be grouped into sets themselves, which are performed as separate calculations. For example, a series of calculations for a first set of rules can be performed, and then a second series of calculations for a second set of rules can be performed, and so forth. Such an approach can be helpful for different accounting perspectives.

For example, the first disaggregation of advertisement costs can be down to a level of product by net revenues. In a second step, the values can be further distributed to the level of the characteristic "Region," depending on the sales quantity per Region.

Example 15

Example Tracing Factors

In any of the examples herein, the cost receivers to which costs for a given accounting cost sender are to be allocated can be indicated by one or more tracing factors. As described herein, tracing factors can be based on sales of a product (e.g., sold units, revenue, revenue—sales deductions, or the like). A proportional rule can then assign rules based on the tracing factors as calculated for the different cost receivers (e.g., products or the like).

Example 16

Figure 6:
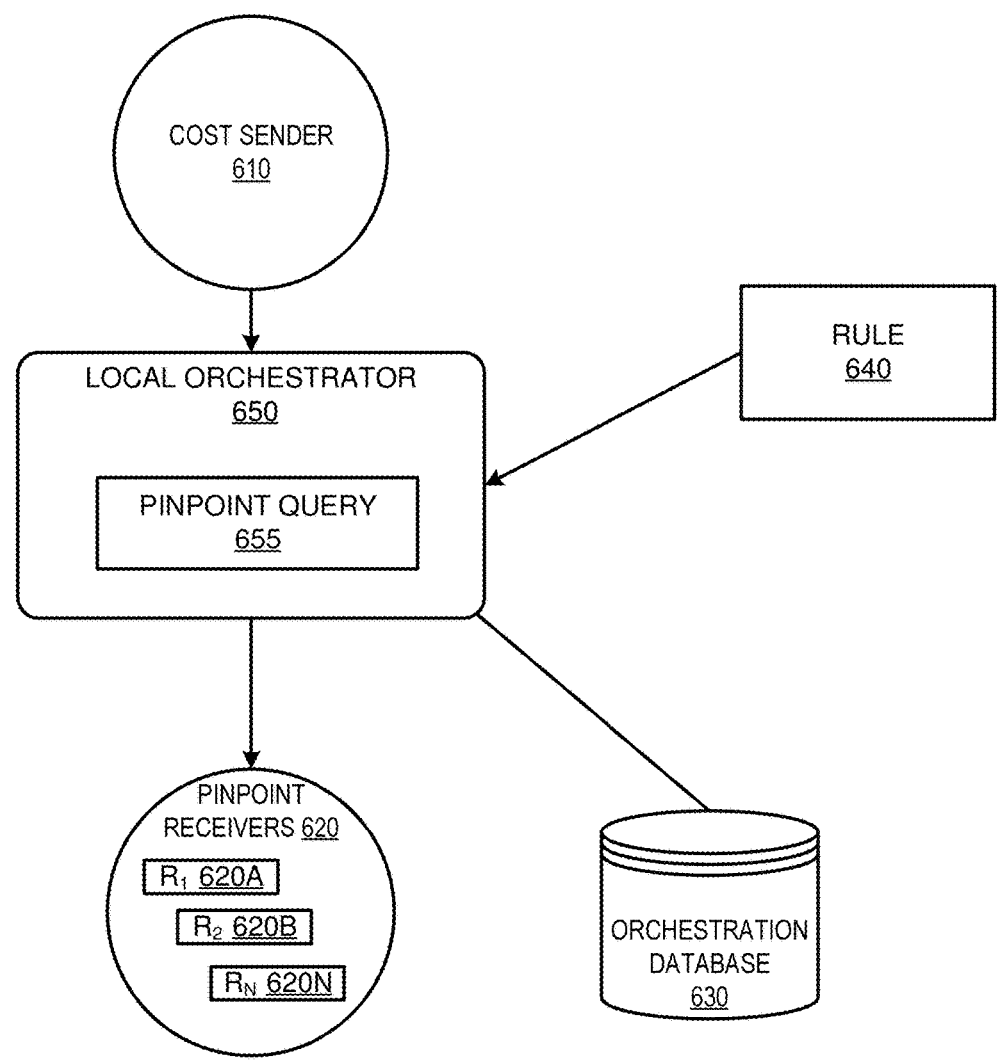
FIG. 6 is a block diagram of an example system implementing a local disaggregation calculation via a pinpoint query.

Example System Implementing a Local Disaggregation Calculation Via a Pinpoint Query FIG. 6 is a of an example system 600 implementing a local disaggregation calculation via a pinpoint query 655 and can be used in any of the systems described herein, such as those shown in FIGS. 1 and 3.

In the example, a local orchestrator (e.g., running within one of the tasks 130A-130N) determines the one or more pinpoint receivers 620A-N for a given accounting cost sender 610.

In the example, the rule 640 can be used to construct the pinpoint query 655, which is run against the orchestration database 630 (e.g., any of the databases described herein). The result of the pinpoint query 655 is a collection of data for the pinpoint receivers 620. Such data can include the sold units, revenue, or the like for different products (e.g., by product characteristic).

In practice, the described orchestrator 650 can generate different pinpoint queries 655 for different of the rules 640 in a series of calculations (e.g., for a number of senders 610). The rule 640 can be associated with or indicate the sender 610, and can be retrieved from an orchestration database 630 as described herein.

Example 17

Figure 7:
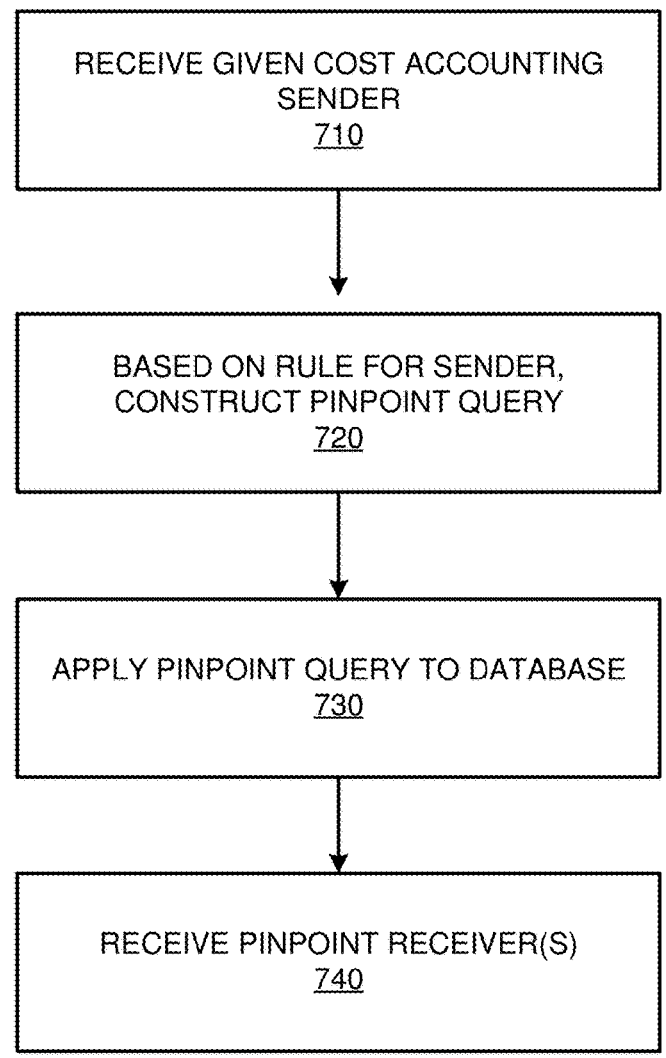
FIG. 7 is a flowchart of an example method of calculating a local disaggregation via a pinpoint query.

Example Method Implementing a Local Disaggregation Calculation Via a Pinpoint Query FIG. 7 is a flowchart of an example method 700 of calculating a local disaggregation via a pinpoint query and can be implemented, for example, in the system shown in FIG. 6 and used in conjunction with any of the methods herein (e.g., such as those shown in FIGS. 2 and 4).

At 710 a given accounting cost sender is received. A rule for the sender can be found, or the sender itself may be indicated by a rule as described herein.

At 720, based on the rule for the sender, a pinpoint query is constructed. As described herein, such a pinpoint query can incorporate desired characteristics of the desired pinpoint receivers (e.g., via a WHERE clause) that are specified via a rule for the sender. For example, the tracing factors can be used.

At 730, the pinpoint query is applied to the database (e.g., the orchestration database as described herein). In any of the examples herein, identifying accounting cost receivers for a sender can comprise performing a pinpoint query returning only the accounting cost receivers to which costs for the given accounting cost sender are to be allocated (e.g., as indicated the associated rule for the sender).

At 740, the one or more pinpoint receivers are received based on the pinpoint query. The pinpoint receivers can then be used in the various disaggregation scenarios described herein.

Example 18

Example Pinpoint Query

In any of the examples herein, a pinpoint query can be constructed to extract only the accounting cost receivers (e.g., the sales data for such receivers) of interest from a database for a given sender via a single query. Such receivers are sometimes called the "pinpoint" receivers or "exact" receivers herein.

Because only the exact receivers are received, tasks executing the procedural aspects of the disaggregation calculation can operate in a smaller memory footprint (e.g., as compared to a calculation that loads receivers from more than one sender into memory and then attempts to locate the appropriate receivers for a given sender). The procedural task to be performed is simplified because the calculation can deal with a given sender and its exact receivers (e.g., to allocate costs from the sender to the exact receivers). Thus, many tasks can be spawned and executed in parallel to solve the overall disaggregation problem represented by a set of receivers.

For example, characteristics of products can be included in WHERE clauses in an SQL SELECT statement. Such a query typically is asking for aggregated data in that some columns are superfluous to the analysis. For example, when determining overhead cost allocation, the customer involved in sales data is not of interest, and typically is not desired to be incorporated into the calculation.

However, sales data typically does include customer number information, which may be of great interest to the entity for other reasons. Therefore, the database can be engineered so that pinpoint queries are able to execute in a reasonable amount of time.

For example, iterating over the rows of a database that are separated by customer number can involve consumption of considerable computing resources, leading to poor performance. As described herein, the data can be aggregated across customer numbers to avoid such a situation, thereby allowing the described technologies to be applied.

Example 19

Example Top-Down Analysis

In any of the examples herein, the technologies can be used to perform a top-down distribution analysis by which costs that are at a high level (e.g., for an entire manufacturing plant or other high level entity) are distributed to actual products or product groups, which are considered to be "lower" in the hierarchy. In practice, the analysis can then proceed to mid-level costs (e.g., for a particular machine that operates on various products), assigning such costs to actual products or product groups. Thus, pinpoint queries can return receivers at a first level (e.g., within a larger group) and then other pinpoint queries can return receivers at a second level (e.g., a subset of the larger group). Cost allocation can then proceed as described herein.

Thus, costs can be distributed according to revenues or sales on a level of a branch of a hierarchical arrangement of products.

Such levels can take a variety of forms (e.g., division, market segment, brand, sub-brand, product line, product group, sub-product group, country, other geographical location, plant, building, designer, subsidiary, and the like).

The analysis can be quite complex, involving hundreds of rules, a thousand or more rules, etc.

Such an analysis may be desired to be performed at the end of a period (e.g., month, quarter, year, or the like) for accounting purposes.

Figure 8:
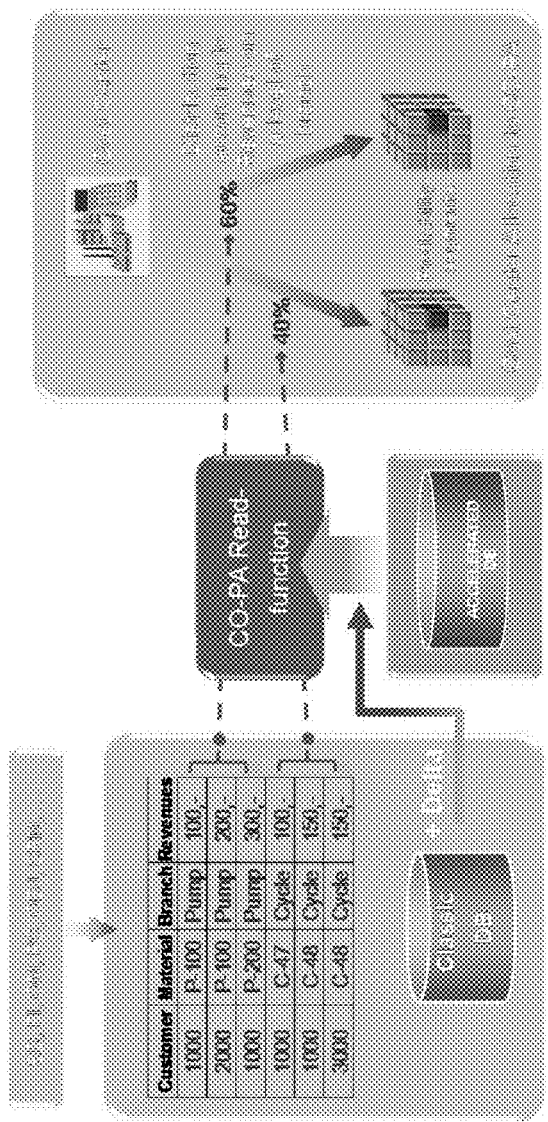
FIG. 8 is a block diagram showing an example implementation of the technologies in a top-down distribution scenario.

FIG. 8 shows an example implementation of the technologies in a top-down distribution scenario. Various ERP modules that deliver data into CO-PA are represented: SD (Sales & Distribution), FI (Financial Accounting), OM (Overheadcost Management), PC (Product Costing), OBJ (Costobject Controlling), and CRM (Customer Relation Management). In practice, an implementation can use other modules to accomplish similar results.

The flexibility of the rules supported allow an interested entity to allocate costs in any of a variety of arrangements.

Example 20

Example Database Table Arrangement

Figure 9:
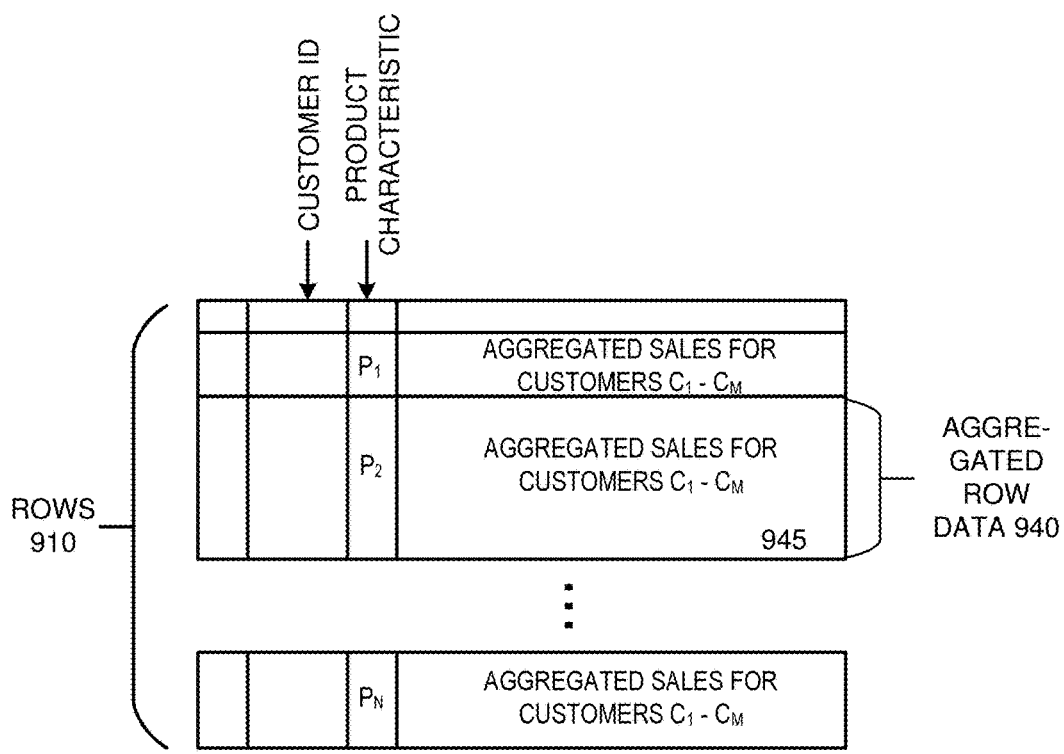
FIG. 9 is a block diagram showing an example database table arrangement for aggregating results before a query is run.

FIG. 9 is a block diagram 900 showing an example database table arrangement for aggregating results before a query is run. In any of the examples herein, a pinpoint query can be run against a columnar database table for which aggregated values are pre-calculated for aggregated rows as shown. Such a database can be maintained beforehand (e.g., pre-calculations are done as data is added, edited, or deleted from the table before the query is received).

In the example, rows 910 of a database table storing sales data for a plurality of accounting cost receivers are stored. Such a table can include columns indicating quantity sold, revenue generated, customer id, product id, product characteristics, and the like.

In the example, the database management system treats the database table on a columnar basis. Pre-calculations of aggregated sales 945 for a plurality of customers are performed by the database before queries are received and stored as aggregated row data 940. Thus, when the pinpoint queries described herein are received by such a database system, the results can be returned immediately, without having to iterate over separate rows (e.g., by customer id) to perform the aggregation (e.g., total sales by product characteristic).

Thus, products typically have sales from a variety of customers, but customer id is treated as a superfluous column and does not impact the calculation. Therefore, performance can be greatly enhanced, not only because the exact receivers can be found by the query in a reasonable amount of time, but also because the calculations for different senders can be performed independently and in parallel (e.g., in different tasks as described herein).

Thus, processing the pinpoint queries by a database management system can avoid aggregating values for aggregated rows for a superfluous column in response to the pinpoint query.

Example 21

Example Implementation

The following example shows a practical implementation of the technologies in pseudo code:

```
Build general processing info:
    Build tables with info about selection for
        source data selection
        reference data selection (including mapping selection info)
        characteristics with processing option distribute
        characteristics with processing option copy
        source record types,
        reference record types
        source periods (TD_PERIO)
        reference periods
        source data curr. selection
        ref data curr. selection
        remaining proc. info
        list of selected value fields TD_FNAM
Build map table T_MAP (source - ref)
    The key is SRC_VRG SRC_CUR SRC_PER
    Determined info is:
    REF_PLIKZ REF_VERSI REF_VRG REF_CUR REF_PER
    CUM_PER CUM_VRG
Read source data into T_SRC (CE1 structure)
    Selected fields are:
        (source) VRGAR, CURR, PERIOD,
        fields with processing option copy and distribute
        selected value fields
    Selection criteria are:
        Source data selection: characteristics + technical fields
        (PER, VRG, CUR)
        Characteristics with processing option distribute equal to
        INITIAL
        If one value field selected , then VF <> 0.
        If more than one value field selected, then at least one
        value field <> 0.
Sort T_SRC by copy fields, VRG, CUR and PER
LOOP over T_SRC.
    For every new combination defined by copy fields, VRG, PER do
    following
        Collect/copy data from T_SRC to SRC_WORK (all source
        periods)
            All entries in T_SRC work have SOBJNR = 1.
        Read reference data for T_SRC_WORK data (info
        obtained from T_MAP)
            Either reading data from buffer T_REF_BUFF
            Or from database (if from database , then check
            whether it's needed later if so, then put copy
            into T_REF_BUFF).
        Put ref. data into T_REF (CE1).
            Every combination of distribute fields will have
            different SOBJNR (CE1- PAOBJNR can be
            used for this purpose).
        Build TD_CONNECT
            First record is source data record (FLNOREC = 'X')
            All remaining records is ref. data, max SOBJNR
            determined from T_REF
        Build TD_VALUES
            Move records from T_SRC_WORK to
            TD_VALUES
                Split by period and value field, move there
                only records, where VF <> 0.
            Move records from T_REF to TD_VALUES
                Split by period and value field butonlyfor
                thoseperiodsandvaluefields,
                whichexistsinTD_VALUES.
        Call RKE_OBJECTS_ALLOCATE
        For objects with no error move result from
```

```
            TD_VALUES to TD_REF and multiply
            values in TD_SRC_WORK with (-1).
        Keep info about erroneous object and value field(s).
        Move data from TD_SRC _WORK and TD_REF to
        result table T_TRG (CE1)
        Check whether ref. data stored in buffer TD_REF_BUFF
        are still needed. If not delete them
End of loop.
```

Example 22

Example Performance Gains

The technologies described herein can be implemented as part of the KE28 transaction of an SAP database management system via HANA database technologies. Thus, the technologies can be applied to a CO-PA profitability analysis. When applied, the technologies described herein resulted in significant performance gains as shown in Table 1.

TABLE 1

Performance Gains

| CO-PA Data<br>~350 Mio Line Items<br>~80 Mio Market-<br>Segments | Standard<br>KE28<br>on HANA | Optimized<br>KE28<br>on HANA | Acceleration in Factors | Acceleration in % |
|---|---|---|---|---|
| Top-Down-<br>Distribution Level 1<br>6 Variants<br>with Postings | 9.193 sec | 175 sec | 52 | 98% |
| 10 Variants<br>without Postings | 6.496 sec | 178 sec | 36 | 97% |
| Top-Down-<br>Distribution Level 2<br>13 Variants<br>with Postings | 41.071 sec | 9.725 sec | 4 | 76% |
| 181 Variants<br>without Postings | 128.317 sec | 1.322 sec | 97 | 99% |
| Total Runtime | 51.4 h | 3.2 h | 16 | 94% |

The KE28 transaction for a sample period (month) was run on HANA without applying the technologies described herein and then run on HANA with the technologies described herein (e.g., "optimized").

Existing KE28 variants were able to be used without changes to customization or job scheduling while observing an acceleration factor exceeding 50 in some cases.

Thus, the method can allocate costs according to 6 rules defining accounting cost receivers and associated accounting cost senders in less than 10 minutes.

In addition, the load on the primary database was significantly reduced during period-end closing activities.

Example 23

Example Entity

A business entity can implement any of the technologies described herein as part of a profitability analysis. Such business entities can take the form of any of a variety of business concerns that wish to evaluate profitability for any of a variety of reasons. In practice, the technologies can be provided by a software developer or service provider to a number of entities (e.g., in a cloud-based scenario, on-premises scenario, or the like).

Example 24

Example Logs

In any of the examples herein, logging can be performed to record the progress of calculations. For example, when a particular rule is successfully executed to disaggregate costs for a send, a log entry can so indicate. When a task completes the senders in its assigned package, a log entry can so indicate.

Error conditions can also be indicated in the log as appropriate.

Example 25

Example Advantages

As described herein, performance can be greatly improved and overall computation time to compute a profitability analysis can be greatly reduced by implementing the technologies described herein.

Further, the amount of procedural memory needed to perform a disaggregation can also be greatly reduced because the number of records that need to be processed in a local calculation involving only the receivers of interest takes much less memory than loading a large number of receivers (e.g., many of which are not of interest) into memory and searching them to determine which ones are of interest.

The paradigm employed by many of the examples herein is to increase the number of database accesses (e.g., one per sender, even if there are a large number of senders). While counterintuitive from a classical database perspective (e.g., reduce the number of database accesses), in practice the result is vastly superior performance.

Although there may be many more queries, the result procedural processing can be very low because only the receivers of interest need be processed. Thus, performance of the overall analysis can be greatly improved, even though there are many more individual database accesses.

Example 26

Example Computing Systems

Figure 10:
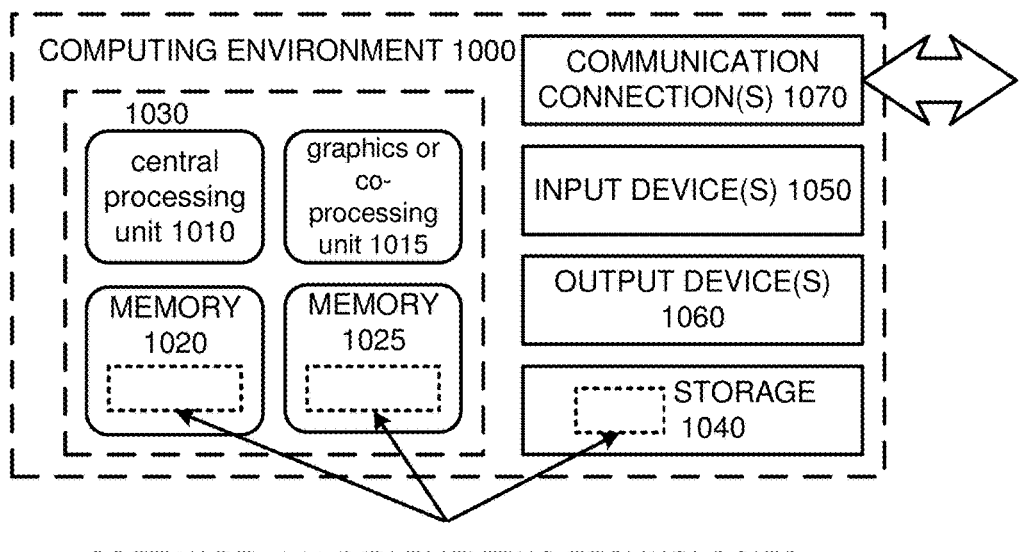
FIG. 10 is a diagram of an example computing system in which described embodiments can be implemented.

FIG. 10 illustrates a generalized example of a suitable computing system 1000 in which several of the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 27

Example Cloud-Supported Environment

Figure 11:
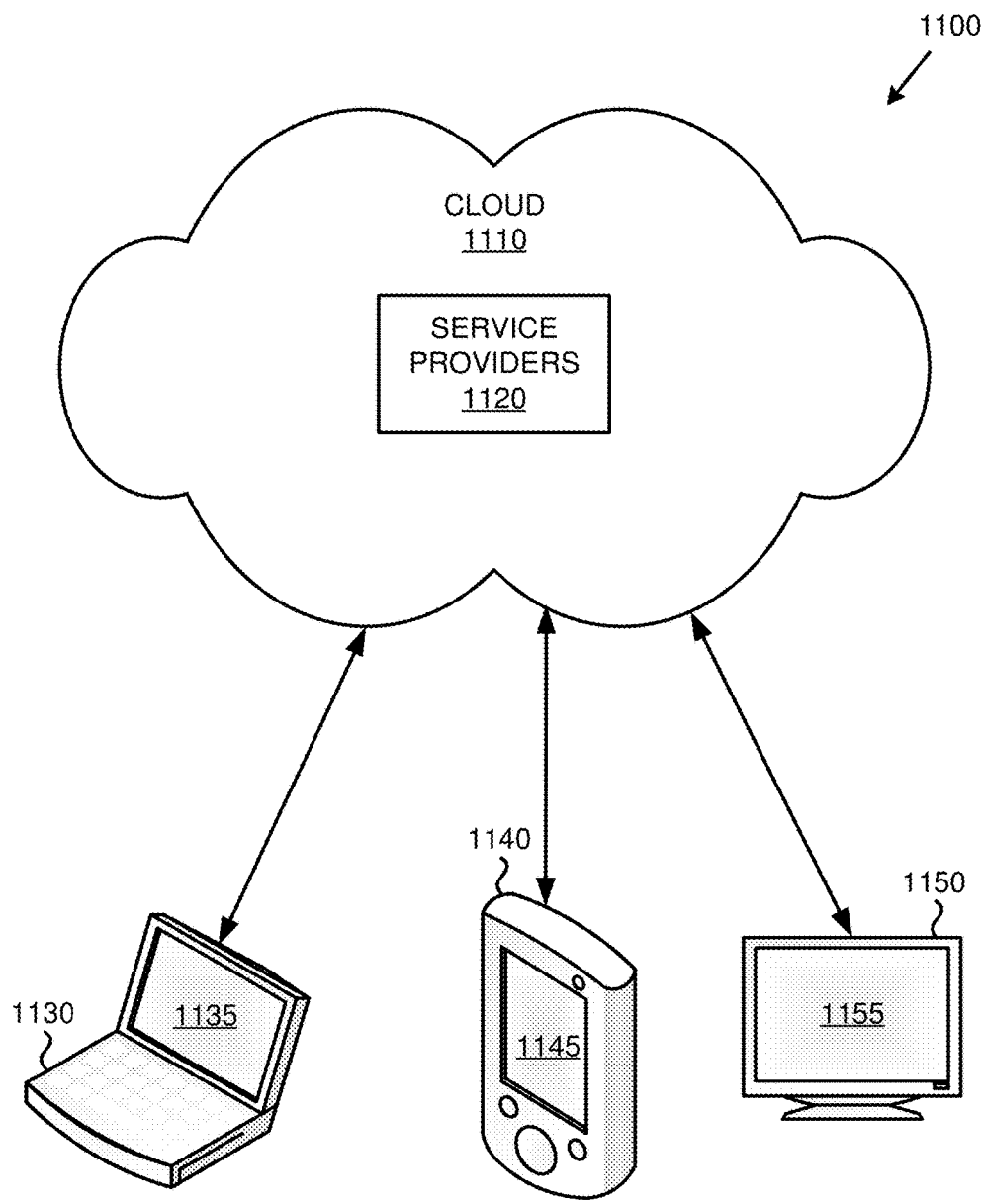
FIG. 11 is an example cloud-support environment that can be used in conjunction with the technologies described herein.

In example environment 1100 of FIG. 11, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touch screen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Example 28

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. In a computing system comprising a memory and one or more processors, a method of processing, in parallel, a plurality of database operations modifying values of a plurality of data recipients based at least in part on values of associated data sources, the method comprising:
    receiving a request to execute a rule specifying an allocation of values between a plurality of data sources and a plurality of data recipients, each data source having a data source identifier and associated with one or more values in one or more tables of a database system, each data recipient having a data recipient identifier and associated with one or more values in one or more tables of the database system;
    distributing each of the data source identifiers to one of a plurality of tasks, each task comprising at least one data source identifier;
    for each of the plurality of tasks, at least a portion of the plurality of tasks being executed in parallel, for each data source identifier of a respective task:
        from the rule, identifying one or more data recipients for the data source identifier;
        from the rule, determining a tracing factor associated with the data source identifier;
        generating a pinpoint query, the pinpoint query defining one or more database operations to retrieve data from one or more database tables of the database system based on the data source identifier and the identified one or more data recipient identifiers;
        executing the pinpoint query on the one or more database tables to retrieve data associated with the data source identifier and the identified one or more data recipient identifiers; and
        disaggregating at least one value provided by retrieved data for the data source identifier by applying at least one mathematical operator, specified by the tracing factor, to the at least one value and retrieved data values for at least one of the identified data recipient identifiers, the disaggregating providing a modified data source value and at least one modified data recipient value; and
    posting the modified data source values and the modified data recipient values to the database system.

2. The method of claim 1, wherein a task of the plurality of tasks comprises a plurality of data source identifiers, the method further comprising:
    collecting modified data source values and modified data recipient values for the plurality of data source identifiers; and wherein posting comprising posting the collected modified data source values and modified data recipient values.

3. The method of claim 1 wherein:
the tracing factor of the rule identifies the one or more data recipients for the data source identifier.

4. The method of claim 1 wherein:
the plurality of tasks are executed independently.

5. The method of claim 1 further comprising:
in a columnar database table, pre-calculating aggregated values for aggregated rows;
wherein executing the pinpoint query comprises running the pinpoint query against the columnar database table for which the aggregated values are pre-calculated for the aggregated rows.

6. The method of claim 5 wherein:
processing of the pinpoint query by a database management system avoids aggregating values for aggregated rows for a superfluous column in response to the pinpoint query.

7. The method of claim 1 wherein:
distributing each of the data source identifiers to one of a plurality of tasks comprises dividing the data source identifiers among the tasks as different packages of pluralities of data source identifiers.

8. The method of claim 1 wherein:
the data recipients comprise one or more different characteristics; and
the disaggregating distributes the at least one value provided by data retrieved from the source identifier among the identified data recipient identifiers based at least in part on the different characteristics.

9. The method of claim 1, wherein the pinpoint query comprises one or more WHERE statements and one or more SELECT statements specifying one or both of the data source identifier and the one or more data recipient identifiers.

10. One or more non-transitory computer-readable media comprising computer-executable instructions causing a computing system to perform a method comprising:
receiving a request to execute a pinpoint query for at least one data source, the at least one data source having a data source identifier;
retrieving at least one rule associated with the at least one data source identifier and specifying an allocation of values between at least the data source associated with the at least one data source identifier and a plurality of data recipients, each data source having a data source identifier and associated with one or more values in one or more tables of a database system, each data recipient having a data recipient identifier and associated with one or more values in one or more tables of the database system;
distributing each of the data source identifiers to one of a plurality of task, each task comprising at least one data source identifier;
for each of the plurality of tasks, at least a portion of the plurality of tasks being executed in parallel, for each data source identifier of a respective task:
from the rule, identifying one or more data recipients for the data source identifier;
from the rule, determining a tracing factor associated with the data source identifier;
generating a pinpoint query, the pinpoint query defining one or more database operations to retrieve data only from one or more database tables of the database system based on the data source identifier and the identified one or more data recipient identifiers;
executing the pinpoint query on the one or more database tables to retrieve data associated with the data source identifier and the identified one or more data recipient identifiers; and
disaggregating at least one value provided by retrieved data for the data source identifier by applying at least one mathematical operator, specified by the tracing factor, to the at least one value and retrieved data values for at least one of the identified data recipient identifiers, the disaggregating providing modified a data source value and at least one modified data recipient value; and
posting the modified data source values and the modified data recipient values to the database system.

11. The one or more non-transitory computer-readable media of claim 10, wherein the pinpoint query comprises one or more WHERE statements and one or more SELECT statements specifying one or both of the data source identifier and the one or more data recipient identifiers.

12. The one or more non-transitory computer-readable media of claim 11 wherein the method further comprises:
in a columnar database table, pre-calculating aggregated values for aggregated rows;
wherein running the pinpoint query comprises running the pinpoint query against the columnar database table for which the aggregated values are pre-calculated for the aggregated rows.

13. A system comprising:
one or more processing units;
memory, the memory comprising computer-executable instructions for performing operations comprising:
on a periodic basis:
retrieving data associated with a plurality of data sources and a plurality of data recipients; and
aggregating the retrieved data according to at least one criterion;
receiving a request to execute a rule specifying an allocation of values between a plurality of data sources and a plurality of data recipients, each data source having a data source identifier and associated with one or more values in one or more tables of a database system, each data recipient having a data recipient identifier and associated with one or more values in one or more tables of the database system;
distributing each of the data source identifiers to one of a plurality of tasks spawned for parallel execution, each task comprising at least one data source identifier;
for each of the plurality of tasks, at least a portion of the plurality of tasks being executed in parallel, for each data source identifier of a respective task:
from the rule, identifying one or more data recipients for the data source identifier;
from the rule, determining a tracing factor associated with the data source identifier;
generating a pinpoint query, the pinpoint query defining one or more database operations to retrieve data from one or more database tables of the database system based on the data source identifier and the identified one or more data recipient identifiers;
executing the pinpoint query on the one or more database tables to retrieve data associated with the data source identifier and the identified one or more data recipient identifiers;

disaggregating at least one value provided by retrieved data for the data source identifier by applying at least one mathematical operator, specified by the tracing factor, to the at least one value and retrieved data values for at least one of the identified data recipient identifiers, the disaggregating providing modified data source values and at least one modified data recipient value; and posting the modified data source values and the modified data recipient values to the database system.

14. The system of claim 13, wherein the at least one criterion comprises ignoring at least one column of a database table comprising values to be aggregated.

15. The system of claim 13, wherein the pinpoint query comprises one or more WHERE statements and one or more SELECT statements specifying one or both of the data source identifier and the one or more data recipient identifiers.

16. In a computing system comprising a memory and one or more processors, a method of processing, in parallel, a plurality of database operations modifying values of a plurality of data recipients based at least in part on values of associated data sources, the method comprising:

receiving a request to execute a rule specifying an allocation of values between a plurality of data sources and a plurality of data recipients, each data source having a data source identifier and associated with one or more values in one or more tables of a database system, each data recipient having a data recipient identifier and associated with one or more values in one or more tables of the database system;

distributing the data source identifiers of the plurality of data sources to one of a plurality of tasks, at least one task comprising a package comprising a plurality of data source identifiers;

for each of the plurality of tasks, at least a portion of the plurality of tasks being executed in parallel, for each data source identifier of a respective task:

from the rule, identifying one or more data recipients for the data source identifier;

from the rule, determining a tracing factor associated with the data source identifier;

generating a pinpoint query, the pinpoint query defining one or more database operations to retrieve data from one or more database tables of the database system based on the data source identifier and the identified one or more data recipient identifiers;

executing the pinpoint query on the one or more database tables to retrieve data associated with the data source identifier and the identified one or more data recipient identifiers; and disaggregating at least one value provided by retrieved data for the data source identifier by applying at least one mathematical operator, specified by the tracing factor, to the at least one value and retrieved data values for at least one of the identified data recipient identifiers, the disaggregating providing a modified data source value and at least one modified data recipient value;

for each of the plurality of tasks, collecting the modified source values and modified data recipient values for data source identifiers of a respective task; and on a task by task basis, posting the collected modified data source values and the modified data recipient values to the database system.

17. The method of claim 16, wherein the pinpoint query comprises one or more WHERE statements and one or more SELECT statements specifying one or both of the data source identifier and the one or more data recipient identifiers.

18. The method of claim 16, the method further comprising, on a periodic basis:

retrieving data associated with a plurality of data sources and a plurality of data recipients; and aggregating the retrieved data according to at least one criterion.

19. The method of claim 18, wherein the at least one criterion comprises ignoring at least one column of a database table comprising values to be aggregated.

20. The method of claim 16, wherein the disaggregation is carried out based at least in part on one or more characteristics of the data recipients associated with the data recipient identifiers.

* * * * *